United States Patent [19]

d'Autume

[11] Patent Number: 5,062,699

[45] Date of Patent: Nov. 5, 1991

[54] PIVOTLESS EQUATORIAL TABLE FOR A TELESCOPE

[75] Inventor: Georges d'Autume, Le Vesinet, France

[73] Assignee: Jupiter Telescope Co., Inc., Wellington, Fla.

[21] Appl. No.: 392,449

[22] Filed: Aug. 11, 1989

[51] Int. Cl.$^5$ .................. G02B 23/16; G02B 23/00
[52] U.S. Cl. ................................. 359/430
[58] Field of Search ............ 350/557, 537–543, 350/563–568; 248/127–132, 180–183

[56] References Cited

U.S. PATENT DOCUMENTS

| | | | |
|---|---|---|---|
| 3,893,746 | 7/1975 | McMahon | 350/568 |
| 3,942,865 | 3/1976 | Rand | 350/568 |
| 3,951,511 | 4/1976 | Parsons | 350/568 |
| 4,050,318 | 9/1977 | Wolf | 350/567 |
| 4,285,567 | 8/1981 | Hansen | 350/568 |
| 4,357,107 | 11/1982 | Rösli | 248/183 |
| 4,400,066 | 8/1983 | Byers | 350/568 |
| 4,541,294 | 9/1985 | Byers | 350/568 |
| 4,875,052 | 10/1989 | Anderson et al. | 248/183 |

OTHER PUBLICATIONS

Roger W. Sinnott (editor), "Gleanings for ATM's", *Sky and Telescope*, Feb. 1980, pp. 163–167.
R. E. Cox and R. W. Sinnott (editors), "Gleanings for ATM's", *Sky and Telescope*, Jan. 1977, pp. 64–67.
Jean Texereau, *How to Make a Telescope*, Appendix 1, pp. 385–389.
Richard Berry, "Telescope Making", #40, Spring 1990, pp. 38–41.

*Primary Examiner*—Bruce Y. Arnold
*Assistant Examiner*—Thong Nguyen
*Attorney, Agent, or Firm*—Gifford, Groh, Sprinkle, Patmore and Anderson

[57] ABSTRACT

A pivotless equatorial table for a telescope comprises a horizontal platform carried by at least five tracks on five rollers. The rollers are attached to a fixed base. The surfaces of the tracks are all rotation symmetrical around a common virtual axis whereby the only motion of the platform is a rotation around the virtual axis. The virtual axis is aligned parallel to the polar axis of the earth. Accordingly, the platform moves around the polar axis.

21 Claims, 2 Drawing Sheets

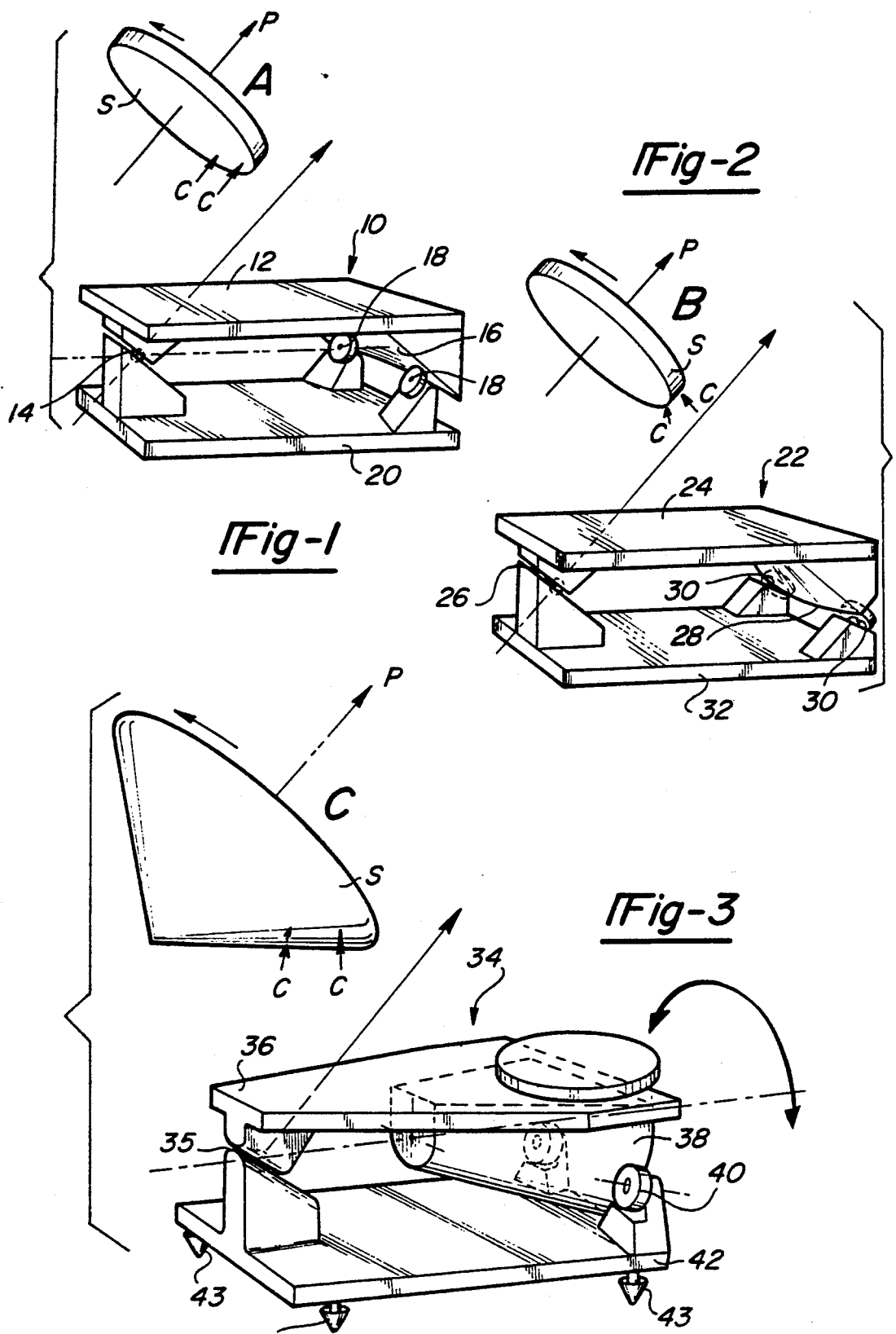

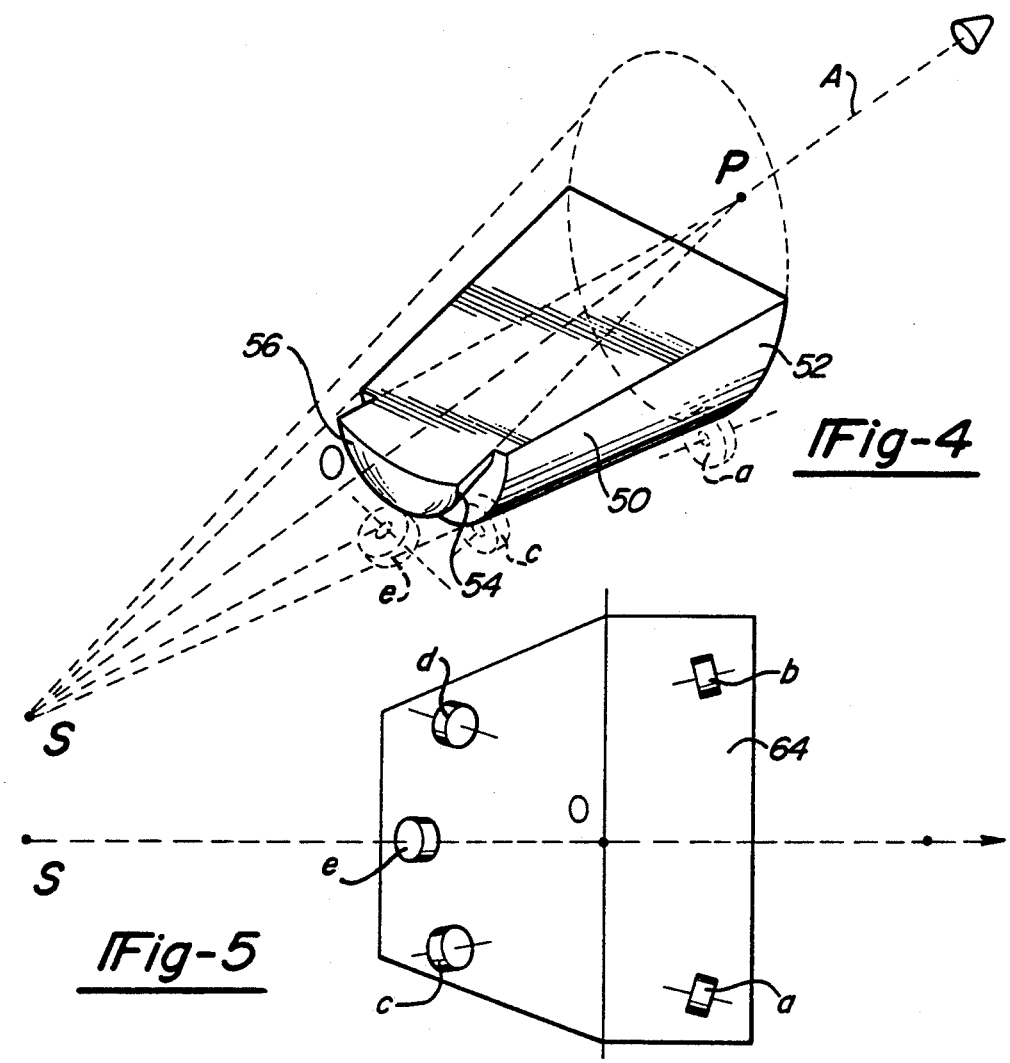
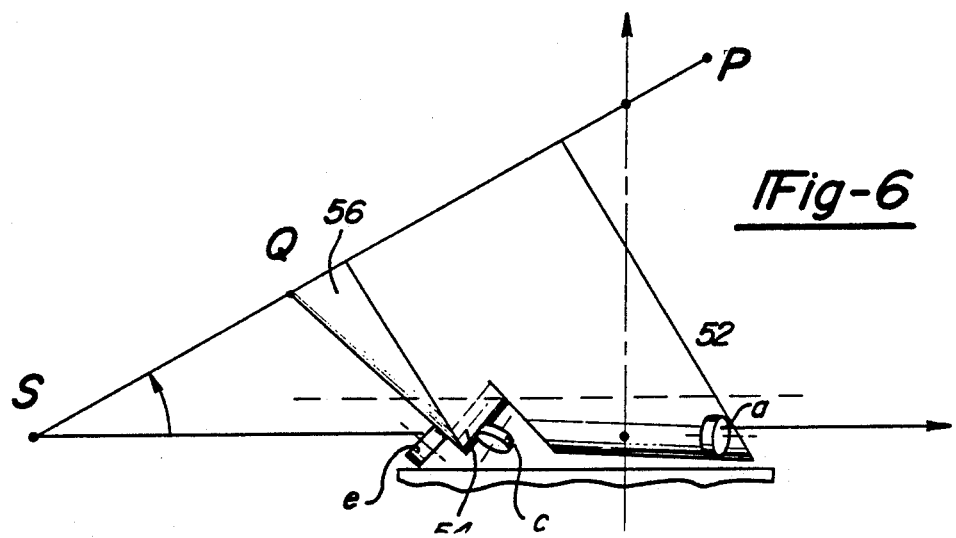

PIVOTLESS EQUATORIAL TABLE FOR A TELESCOPE

BACKGROUND OF THE INVENTION

I. Field of the Invention

The present invention relates generally to tracking systems. More particularly, the present invention relates to a tracking system for optical telescopes, radio telescopes, satellite tracking devices, and for any other instrument where counter-rotational movement with respect to the motion of the earth about its axis is useful.

II. Description of the Relevant Art

For many years the ownership of large-apertured telescopes that could track celestial objects has been limited to persons or institutions capable of affording expensive mounting and tracking systems. In addition, such systems suffered from a lack of portability for these larger scopes.

Popularization of alt-azimuth mounted instruments such as the Dobsonian style telescope brought large apertures to the public, but these instruments lacked any tracking ability and had to be pushed along by hand in order to keep an object in the field of view as the earth rotated about its axis under the night sky.

However, with the introduction of the Dobsonian style telescope, the necessary equatorial table developed more or less in conjunction therewith has failed to provide the solution of problems related to use of the table with large-apertured telescopes. The major problem relates to the fact that optimally, with respect to an equatorial mounting, the center of gravity of the movable portion should lie on the polar axis. In addition, use of conventional tables also presents problems at extremely high or low latitudes.

Prior approaches to equatorial tables have failed to eliminate these problems.

One of the first equatorial table designs, that proposed by Adrien Poncet, utilizes a fixed-pivot along the polar axis and a pair of rollers coacting against a plane where the plane runs transverse to the polar axis. The Poncet design, while working well at fairly high latitudes where the planar surface can coact well with the rollers, is increasingly unsatisfactory at increasingly lower latitudes because the planar surface must become increasingly vertical. The design is useless for application at the equator.

Conversely, a later table design, that proposed by Alan E Gee, provides a table useful at low latitudes, but does not work well at all at high latitudes. According to the Gee table, a fixed pivot is utilized along the polar axis. Fitted to the bottom side of the telescope-receiving table is a segment of a cylindrical surface, the outer edge of which rides along a pair of rollers.

Accordingly, prior approaches to resolving the problems of known equatorial tables for Dobsonian style telescopes have failed.

SUMMARY OF THE PRESENT INVENTION

The present invention provides a pivotless equatorial table primarily for an optical telescope, although the present invention may be extended for application to radio telescopes, satellite tracking devices, or any other instrument where counter-rotational movement with respect to the motion of the earth about its axis is useful. When instruments already free to be pointed in both altitude and azimuth are placed atop this table, and the table is appropriately motorized, the entire instrument is effective in tracking most celestial objects, or compensating for the rotation of the earth. Unlike previous designs, the great flexibility of the present invention allows for an axis of rotation to pass through the center of gravity of the movable section, thereby improving balance and reducing energy required to power the table while keeping the size of the table at near minimum.

The general design of the equatorial table of the present invention consists of a horizontal or substantially horizontal platform, carried by means of five tracks defined on three support segments fitted to the bottom side of the platform, the tracks resting upon five rollers attached to a fixed base. Contact structures other than rollers are possible and may include bearings, bushings, sliding pads or the like. The surfaces of the tracks are all rotation symmetrical about a common virtual axis. Accordingly, the only possible motion of the platform is a rotation around this axis. The virtual axis is aligned parallel to the polar axis of the earth whereby the platform will then move around the polar axis. This can be achieved either by design or by the use of leveling screws.

The surfaces of the tracks can be chosen in such a manner that the platform is constrained to rest on the five rollers by irs own weight, plus the weight of its load, the center of gravity of the whole movable part lies on the virtual axis and the reactions at the supporting points are minimized.

A more specific design of the equatorial table which is described at length and depicted in diagrams hereafter allows for maximum constraint, minimal reactions at the supporting points and practical construction.

In northern latitudes, two rollers are located at the northern end of the platform (symmetrical to the plane of the meridian) and have horizontal axes. The tracks riding on these rollers are conical. At the southern end of the table are three rollers, two are symmetrical to the plane of the meridian and have their axes at 45 degrees to the plane of the base. The surfaces of the tracks riding on these two rollers is also conical, except at latitude 45 degrees. Ar this latitude, the surface degenerates to a cylinder. The third roller lying on the meridian plane has its axis also at 45 degrees to the plane of the base. However, it is aligned in an approximate opposing direction to that of the other two southern rollers. The surface track for this roller is a third supporting surface. This surface is an equatorial plane (that is, at right angles with the polar axis) at latitude 45 degrees, a convex conical surface at latitudes below 45 dgrees, and a concave conical surface at latitudes above 45 degrees.

Significantly, the vertices of all conical track surfaces lie on the axis of rotation of the entire table, as does the center of gravity of the movable section (platform plus load), and the axis of rotation is parallel to the polar axis of the earth. The axis of each of the rollers is also aligned in the approximate direction of the conical surface which it supports. For southern latitudes the positions of the rollers and surfaces on the northern and southern ends are reversed.

The table according to the present invention may be powered by number of different methods such as the attachment of a sector gear to the bottom front end of the table (north end). Such a gear would be circular with rotational symmetry about the virtual rotational axis of the table and powered by an electric motor coacting with a driving worm The table could also be powered by application of a rotational force to one of the north rollers (friction drive). Any number of methods could be used along these lines. The important aspect is that the table must be made to rotate at a rotational speed equal to that of the earth, but in an opposite direction.

Other advantages and features of the present invention will become apparent from the following detailed description when read in conjunction with the accompanying drawing.

BRIEF DESCRIPTION OF THE DRAWINGS

The present invention will become more fully understood by reference to the following detailed description of the preferred embodiments of the present invention when read in conjunction with the accompanying drawings, in which like reference characters refer to like parts throughout the views, and in which:

FIG. 1 is a perspective view of an equatorial table according to the Poncet design;

FIG. 2 is a perspective view of an equatorial table according to the Gee design;

FIG. 3 is a perspective view of an equatorial table according to the inventor's initial modification;

FIG. 4 is a perspective view of the conical assembly of the present invention;

FIG. 5 is a top plan view of the table base illustrating the placement of the contact points embodied as five rollers; and FIG. 6 is a conceptual view of the cones partially defined by the conical supporting surfaces.

DETAILED DESCRIPTION OF THE PREFERRED EMBODIMENT OF THE PRESENT INVENTION

The drawing discloses the preferred embodiment of the present invention. While the configurations according to the illustrated embodiment is preferred, it is envisioned that alternate configurations of the present invention may be adopted without deviating from the invention as portrayed. The preferred embodiment is discussed hereafter.

Referring to FIG. 1, a Poncet equatorial table, generally indicated as 10, is illustrated. The table 10 includes a table platform 12 having fitted to its underside a fixed pivot 14 and a planar contact surface 16. Coacting with the planar contact surface 16 are a pair of rollers 18. A table base 20 supports the operating elements of the table 10.

A stylized method of rotation and surface contact is illustrated as "A". Rotating about the polar axis "P", the contact surface "S" applies force to the contact points "C". Again, as noted above, this design works well at fairly high latitudes, but not at all at low latitudes.

FIG. 2 ilustrates a Gee equatorial table, generally illustrated as 22. The table 22 includes a table platform 24 having fitted to its underside a fixed pivot 26 and a segment of a cylindrical contact surface 28. Coacting with the cylindrical contact surface 28 are a pair of rollers 30. A table base 32 supports the operating elements of the table 22.

A stylized method of rotation and surface contact is illustrated as "B". Rotating about the polar axis "P", the contact surface "S" applies force to the contact points "C". This design works well at fairly low latitudes, but not at high latitudes.

Referring to FIG. 3, a perspective view of an equatorial table according to the present inventor's initial modification is thereshown, indicated generally as 34. The table 34 includes a table platform 36 having fitted to its underside a fixed pivot 35 and a segment of a conical surface 38. Coacting with the conical surface 38 are a pair of rollers 40 with horizontal axes. A table base 42 supports the operating elements of the table 34.

A stylized method of rotation and surface contact is illustrated as "C". Rotating about the polar axis "P", the contact surface "S" applies force to the contact points "C". This design improves over the latitude-related problems of the designs of FIGS. 1 and 2, but still fails in overcoming the problem relating to the above-the-polar-axis center of gravity of fixed pivot designs.

With reference to FIG. 4, a perspective view of the conical assembly of the present invention, generally indicated as 50, is illustrated. The conical assembly 50 is the heart of the present invention and comprises three portions: A first supporting surface 52 defined by a first conical segment; a second supporting surface 54 defined by a second conical segment; and a third supporting surface 56 defining a base end of the second conical segment. The third supporting surface is a third conical segment having its vertex at "Q" lying on the rotational axis "A" when the table is used at latitudes lower than 45°. At latitude 45°, the third supporting surface is an equatorial plane. At latitudes higher than 45°, the third supporting surface would be a concave cone.

The cone defined by the first supporting surface 52 has its vertex along the common virtual axis "A" at point "S".

The cone defined by the second supporting surface 54 has its vertex along the common virtual axis "A" at point "P".

In all cases here the common virtual axis "A" is parallel to the polar axis of the earth.

Referring to FIG. 5, a top plan view of the table base 64 is shown and has mounted thereto rollers a, b; c, d; and e. The contact points (or faces) of the rollers a, b; c, d; and e all lie on a horizontal plane The rollers a, b; and c, d; are symmetrically located to the left and right of the meridian plane. The meridian plane passes through the roller e. The axes of the rollers c, d, e are inclined by 45° with respect to the base plane. The plane upper side of the table base 42 carrying the rollers a, b, c, d, e.

As may be understood, the rollers a, b work against the surface 52, while the rollers c, d work against the surface 54. The roller e works against the surface 56.

Referring to FIG. 6, a conceptual view of the cones partially defined by the conical supporting surfaces is shown. With reference then to both FIGS. 5 and 6, it should be clear that the rollers a, b preferably have horizontal axes. The rollers c, d, e preferably have their axes inclined by 45° rising northwards for c and d, sourthwards for e. As can be understood from the figure, the rollers each has an axis in parallel alignment with its associated supporting surface. This construction provides for the preferred maximum constraint of the conical assembly 50.

Where the table is employed at latitude 45°, the axes of the rollers c, d are aligned parallel to the polar axis. The roller e would be set perpendicularly to the polar axis. When at this latitude, the contact surfaces are a cylindrical surface with their parallels to the polar axis for c and d, and an equatorial plane for e. As mentioned above, when used at latitudes higher than 45°, the surface 56 would be configured as a concave cone. It should be emphasized that the analysis of the preferred embodiment above refers only to the case in which the axes of rollers c, d, e are inclined 45°. Although this choice has advantages (better constraint, standardization of roller mounts), it is not essential.

As may be understood by reference to FIGS. 4 and 6, five contact points (rollers a, b, c, d and e) are provided with each contact point constraining a particular point on the assembly 50. According to FIGS. 4 and 6, the contact points define circles and conical sections lying in parallel planes. Each of the circles has a center, and the centers are situated on a straight line perpendicular to the plane. Although applicant has described his invention utilizing a "male" conical assembly riding on a "female" system of rollers, Applicant notes that the reverse system may be employed whereby a concave assembly acts as the table base and rollers are fitted to the bottom side of the table platform for coacting within the table base.

Having described my invention, however, many modifications thereto will become apparent to those skilled in the art to which it pertains without deviation from the spirit of the invention as defined by the scope of the appended claims.

I claim:

1. A pivotless equatorial table for a telescope, said table comprising:
   a substantially planar telescope table portion, said table portion having a top side and a bottom side;
   a table base situated below said table portion;
   said table base having provided thereupon a plurality of rolling bodies;
   a conical assembly for coacting said table portion with said plurality of rolling bodies about a common virtual axis, said common virtual axis being aligned in parallel with the polar axis of the earth;
   said conical assembly comprising a plurality of tracks constrained by gravity to remain in contact with said plurality of rolling bodies;
   said tracks being rotation 21 symmetrical about said common virtual axis.

2. A pivotless equatorial table for a telescope, said table comprising:
   a substantially planar telescope table portion, said table portion having a top side and a bottom side;
   a first supporting surface defined by a first conical segment, said first segment being fitted to said bottom side of said table portion;
   said first conical segment having a vertex on a point of a virtual rotational axis of said table, said axis being parallel to the polar axis of the earth;
   a second supporting surface defined by a second conical segment, said second segment being fitted to said bottom side of said table portion;
   said second conical segment having a vertex on a point of said virtual rotational axis;
   said second conical segment having a base end, said base defining a third supporting surface; and
   means for carrying each of said first, second and third supporting surfaces.

3. The equatorial table for a telescope according to claim 2 wherein said third supporting surface defines a substantially planar surface at latitude 45 degrees, the plane of said surface transversing said virtual rotational axis.

4. The equatorial table for a telescope of claim 2 wherein said third supporting surface is conical.

5. The equatorial table for a telescope of claim 4 wherein said base end is defined by a cone having its vertex on said virtual rotational axis.

6. The equatorial table for a telescope of claim 2 further including a table base for supporting said means for carrying.

7. The equatorial table for a telescope of claim 6 wherein said means for carrying said first supporting surface comprises a pair of spaced apart rolling bodies having contact points upon said first supporting surface.

8. The equatorial table for a telescope of claim 7 wherein said rolling bodies comprise rollers, each of said rollers having an axis in parallel alignment with said first supporting surface.

9. The equatorial table for a telescope of claim 8 wherein said means for carrying said second supporting surface comprises a pair of spaced apart rolling bodies having contact points upon said second supporting surface.

10. The equatorial table for a telescope of claim 9 wherein said rolling bodies comprise rollers, each of said rollers having an axis in parallel alignment with said second supporting surface.

11. The equatorial table for a telescope of claim 10 wherein said means for carrying said third supporting surface comprises a single rolling body having a contact point upon said third supporting surface.

12. The equatorial table for a telescope of claim 11 wherein said single rolling body comprises a roller, said roller having an axis in parallel alignment with said third supporting surface.

13. The equatorial table for a telescope of claim 12 wherein said table base has a top side and a bottom side, said bottom side having at least one levelling assembly fitted thereto.

14. An equatorial table for a telescope, said table comprising:
   a table portion for supporting said telescope;
   said table portion having a top side and a bottom side;
   means for allowing rotation of said table portion about a virtual rotational axis parallel to the polar axis of the earth;
   said means comprising at least one conical surface, said at least one conical surface being defined by a cone having its vertex on said virtual rotational axis.

15. The equatorial table for a telescope of claim 14 wherein said means for allowing rotation of said table portion about said virtual rotational axis comprises a first supporting surface defined by a first cone having its vertex on said axis and a second supporting surface defined by a second cone having its vertex on said axis.

16. The equatorial table for a telescope of claim 15 wherein said vertex of said first cone falls upon a point on said virtual rotational axis south of said vertex of said second cone.

17. The equatorial table for a telescope of claim 15 wherein said means for allowing rotation of said table portion about said virtual rotational axis further comprises a third supporting surface defined by a third cone having its vertex on said axis.

18. The equatorial table for a telescope of claim 17 wherein said vertex of said second cone falls upon a point on said virtual rotational axis north of said vertex of said first cone and said vertex of said third cone falls upon a point on said axis between said vertex of said first cone and said vertex of said second cone.

19. The equatorial table for a telescope of claim 17 further including:
   a table base; and
   means for coacting said table portion and said table base at said first, second and third supporting surfaces.

20. The equatorial table for a telescope of claim 19 wherein said means for coacting comprises:
   at least one rolling body coacting with said first surface;
   at least one rolling body coacting with said second surface;
   a rolling body coacting with said third surface; and five contact points for coacting with said rolling bodies.

21. An equatorial table for a telescope, said table comprising:
   a table portion;
   a base portion coacting with said table portion;
   five contact points, each contact point constraining a particular point on said table portion to lie on a particular point on said base portion;
   said contact points defining circles and conical sections lying in parallel planes, each of said circles having a center, said centers being situated on a straight line perpendicular to said planes.

* * * * *

UNITED STATES PATENT AND TRADEMARK OFFICE
CERTIFICATE OF CORRECTION

PATENT NO.  : 5,062,699
DATED       : November 5, 1991
INVENTOR(S) : Georges D'Autume It is certified that error appears in the above-indentified patent and that said Letters Patent is hereby corrected as shown below:

Column 5, line 41, delete "21".

Signed and Sealed this

Fifteenth Day of June, 1993

Attest:

MICHAEL K. KIRK

Attesting Officer        Acting Commissioner of Patents and Trademarks